United States Patent
Siegel et al.

(10) Patent No.: US 9,610,908 B2
(45) Date of Patent: Apr. 4, 2017

(54) DEVICE FOR SETTING AT LEAST ONE OPERATING PARAMETER OF AT LEAST ONE VEHICLE SYSTEM IN A MOTOR VEHICLE

(75) Inventors: Andreas Siegel, Ingolstadt (DE); Michael Reichel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 21 days.

(21) Appl. No.: 14/342,659

(22) PCT Filed: Aug. 30, 2012

(86) PCT No.: PCT/EP2012/003637
§ 371 (c)(1),
(2), (4) Date: Mar. 4, 2014

(87) PCT Pub. No.: WO2013/029787
PCT Pub. Date: Mar. 7, 2013

(65) Prior Publication Data
US 2014/0222253 A1  Aug. 7, 2014

(30) Foreign Application Priority Data
Sep. 2, 2011 (DE) .................. 10 2011 112 371

(51) Int. Cl.
*G05D 1/00* (2006.01)
*G05D 3/00* (2006.01)
(Continued)

(52) U.S. Cl.
CPC .......... *B60R 16/037* (2013.01); *B60W 50/08* (2013.01); *G07C 9/00563* (2013.01); *B60K 2350/1052* (2013.01)

(58) Field of Classification Search
CPC ....... B60R 16/02; B60R 16/037; B60R 25/24; B60W 50/08; B60K 28/06;
(Continued)

(56) References Cited

U.S. PATENT DOCUMENTS 7,046,130 B2  5/2006  Kusano
7,792,328 B2  9/2010  Albertson et al.
(Continued)

FOREIGN PATENT DOCUMENTS

CN    1504941    6/2004
CN  101234223    8/2008
(Continued)

OTHER PUBLICATIONS

Hildebrand "English Translation for Reference EP1972511", Sep. 2008.*
(Continued)

*Primary Examiner* — Jerrah Edwards
*Assistant Examiner* — Rachid Bendidi
(74) *Attorney, Agent, or Firm* — Staas & Halsey LLP

(57) ABSTRACT

A device sets at least one operating parameter of at least one vehicle system of a motor vehicle. The device has at least one movement detection apparatus for determining the movement of at least one person located inside or in the vicinity of the motor vehicle, which movement detection apparatus is designed to determine at least one person-specific movement information item using at least one person-specific movement signal which is supplied by a person-side movement sensor system and relates to the movement of the person. The device is designed to set the at least one operating parameter of the at least one vehicle system using the person-specific movement information item. The device also has a memory in which certain settings of an operating parameter of a vehicle system are assigned to certain person-specific movement information items.

18 Claims, 3 Drawing Sheets

(51) Int. Cl.
*G06F 7/00* (2006.01)
*G06F 17/00* (2006.01)
*B60R 16/037* (2006.01)
*G07C 9/00* (2006.01)
*B60W 50/08* (2012.01)

(58) Field of Classification Search
CPC ............ B60K 2350/1052; G08B 21/06; G07C 2009/0096; G07C 2009/00111; G07C 2009/00555; G07C 2009/00317; G07C 2209/08; G07C 2209/63; G07C 9/00; G07C 9/00563; G07C 9/00111; G07C 9/00309; G07C 2009/0038
USPC .................................... 701/2, 26; 340/932.2
See application file for complete search history.

(56) References Cited

U.S. PATENT DOCUMENTS

| | | | |
|---|---|---|---|
| 7,982,618 B2 | 7/2011 | Omi et al. | |
| 2004/0160327 A1* | 8/2004 | Kusano | G08B 25/016 340/576 |
| 2007/0156320 A1* | 7/2007 | Breed | B60C 23/0408 701/70 |
| 2008/0169914 A1* | 7/2008 | Albertson | B60W 40/09 340/438 |
| 2008/0180257 A1* | 7/2008 | Omi | G08B 21/06 340/575 |
| 2011/0118946 A1* | 5/2011 | Reimann et al. | 701/49 |
| 2013/0311004 A1* | 11/2013 | Okamura et al. | 701/2 |
| 2014/0303811 A1* | 10/2014 | Ledendecker | G07C 9/00944 701/2 |
| 2014/0375423 A1* | 12/2014 | Lagabe | 340/5.61 |

FOREIGN PATENT DOCUMENTS

| | | |
|---|---|---|
| DE | 10103401 | 8/2002 |
| DE | 10105060 | 8/2002 |
| DE | 10106400 | 8/2002 |
| DE | 102005004443 | 8/2006 |
| DE | 102005031318 | 2/2007 |
| DE | 60215504 | 9/2007 |
| DE | 102007023140 | 10/2008 |
| DE | 102008025669 | 12/2008 |
| DE | 102007050075 | 4/2009 |
| DE | 102007051543 | 4/2009 |
| DE | 102009003718 | 10/2010 |
| DE | 102011112371 | 9/2011 |
| EP | 1033687 | 9/2000 |
| EP | 1972511 | 9/2008 |
| EP | 2012/003637 | 8/2012 |
| FR | 2798691 | 3/2001 |
| GB | 2428802 | 2/2007 |
| JP | 2003-93566 | 4/2003 |
| JP | 2007-207228 | 8/2007 |
| JP | 2008-293501 | 12/2008 |
| WO | 2009/024602 | 2/2009 |

OTHER PUBLICATIONS

English Translation for reference FR2798691.*
Chinese Office Action for related Chinese Patent Application No. 2012800415649, issued on May 6, 2015, 10 pages (8 page Partial English Language Translation).
German Office Action for German Priority Patent Application No. 10 2011 112 371.0, issued Aug. 10, 2012, 5 pages.
WIPO English Language Translation of International Preliminary Report on Patentability for PCT/EP2012/003637, Downloaded from WIPO Website Mar. 4, 2014, 8 pages.
English Language Translation of International Search Report for PCT/EP2012/003637, mailed Nov. 22, 2012, 2 pages.
Chinese Office Action dated Dec. 24, 2015 from Chinese Patent Application No. 201280041564.9, 8 pages.
Chinese Office Action dated Jul. 22, 2016 from Chinese Patent Application No. 201280041564.9, 8 pages.
European Office Action dated Nov. 22, 2016, from European Patent Application No. 12766875.4, and a machine generated English language translation thereof obtained from Google translate (16 pages total).
Chinese Office Action dated Dec. 29, 2016 from Chinese Patent Application No. 201280041564.9, 8 pages.

* cited by examiner

DEVICE FOR SETTING AT LEAST ONE OPERATING PARAMETER OF AT LEAST ONE VEHICLE SYSTEM IN A MOTOR VEHICLE

CROSS REFERENCE TO RELATED APPLICATIONS

This application is based on and hereby claims priority to International Application No. PCT/EP2012/003637 filed on Aug. 30, 2012 and German Application No. 10 2011 112 371.0 filed on Sep. 2, 2011, the contents of which are hereby incorporated by reference.

BACKGROUND

The invention relates to a device for setting at least one operating parameter of at least one vehicle system of a motor vehicle.

Devices for setting at least one operating parameter of at least one vehicle system of a motor vehicle are known per se and are basically present in modern motor vehicles in at least a simple design. Control information which is transmitted to different vehicle systems provided on the motor vehicle side and control apparatuses associated therewith and brings about settings or changes in operating parameters at said vehicle systems and associated control apparatuses is usually transmitted via corresponding devices. In this way, it is possible, for example, to make settings of a driver assistance system embodied as a longitudinal guidance system, such as, for example, a distance which is to be maintained from a vehicle traveling ahead.

Hitherto, for this purpose it has usually been provided that in order to generate corresponding control information or to make settings or changes to a corresponding operating parameter it has been necessary to activate activation elements manually. By way of example, reference is made in this context to corresponding turn and turn and press controllers by which a large number of operating parameters of different vehicle systems can be set.

In this context, the handling of corresponding activation elements and therefore the adaptability of corresponding operating parameters of corresponding vehicle systems, in particular for persons who are inexperienced in terms of said systems, can be difficult and complex, and there is therefore a need to be able to make corresponding settings of corresponding operating parameters and corresponding vehicle systems in an easier and, in particular, more intuitive way.

DE 101 06 400 A1 relates to an access control system for a motor vehicle in which a transponder transmits a code word to a control unit. In order to avoid wasting energy, an activation element is to be activated only if motor-vehicle-side movement sensors detect an activation pattern assigned to the activation element.

DE 101 05 060 A1 relates to a further access control system of this type in which it is intended to make it possible to increase security. For this purpose, both the motor vehicle and the transponder comprise movement sensors whose movement pattern is compared, wherein the communication channel is enabled for authorization checking only when the movement patterns correspond.

SUMMARY

One possible object is to improve a device for setting at least one operating parameter of at least one vehicle system of a motor vehicle in terms of the operating capability or adaptability of corresponding operating parameters.

The inventors propose a device of the type mentioned at the beginning which is defined by the fact that it comprises at least one movement detection apparatus for determining the movement of at least one person located inside or in the vicinity of the motor vehicle, which movement detection apparatus is designed to determine at least one person-specific movement information item using at least one person-specific movement signal which is supplied by a person-side movement sensor system and relates to the movement of the person, wherein the device is designed to set the at least one operating parameter of the at least one vehicle system using the person-specific movement information item, wherein the device comprises a memory in which certain settings of an operating parameter of a vehicle system are assigned to certain person-specific movement information items.

According to the proposal, a device for setting at least one operating parameter of at least one vehicle system of a motor vehicle is proposed in which settings or changes to corresponding operating parameters can be made intuitively by movements of a person. Movements can be understood here to mean consciously executed movements, that is to say, in particular, gestures, as well as unconsciously executed movements of a person. The movements are sensed by a movement sensor system which is a person-side system, that is to say is assigned to the respective person and detects the movements thereof, in the form of person-specific movement signals and transmitted to a movement detection apparatus which is associated with the device, which movement detection apparatus converts the person-specific movement signals into person-specific movement information. After the evaluation or interpretation of the person-specific movement information, which accordingly maps a specific movement or else movement sequence of a person, the device performs, where appropriate, a certain setting of certain operating parameters of certain vehicle systems of the motor vehicle. The principle accordingly permits particularly simple and intuitive setting or adaptation of corresponding operating parameters by movements or gestures which are carried out by the person.

The principle can be explained using the following examples. In a first example, a person who is equipped with a person-side movement sensor system and is located outside a locked motor vehicle, that is to say in the vicinity of the motor vehicle, carries out a certain movement, for example a circular movement, for example with his right arm. It is also conceivable that the person draws his signature in the air with his right hand. The movement or gesture carried out by the person is detected by the movement sensor system and converted into person-specific movement signals which are transmitted to the movement detection apparatus and converted there into a person-specific movement information item. The person-specific movement information item accordingly contains a mapping of the movement carried out by the person. After evaluation or interpretation of the person-specific movement information containing the movement or gesture actually carried out by the person, a vehicle system, for example in the form of an unlocking system embodied as a central locking system, is actuated in such a way that the motor vehicle is unlocked. If appropriate, plausibility checking can additionally be carried out by detecting a key, with the result that corresponding unlocking of the motor vehicle which is based on a movement or gesture can be carried out, for example only by the carrier of the key which is assigned to the motor vehicle.

Using the first example it is also apparent that the principle has advantages in terms of security technology since, for example, persons without authorized possession of the key cannot gain access to the interior of the vehicle unless they know the certain movement or gesture which is necessary to activate the unlocking system. In addition, said persons must have a person-side movement sensor system which transmits corresponding movement signals based on the certain movement or gesture to the movement detection apparatus. Overall, possession of the key without knowledge of corresponding movements or gestures necessary to unlock the motor vehicle is accordingly useless in terms of accessing the interior of the vehicle.

In a second example, a person has sat down on the driver's seat of the motor vehicle. Person-specific movement signals are in turn generated by the person-side movement sensor system through a movement, for example, of the left arm, from a raised position to a lower position, and said movement signals are transmitted to the movement detection apparatus and converted thereby into a corresponding movement information item. The movement information is evaluated or interpreted and used, for example, to set a driver-side window activation system, after which the driver-side window opens. Activation of a known switch-like activation element is therefore not necessary to open, and of course also to close, the window, even if a corresponding activation element can nevertheless be present. Here it is also possible, where appropriate, to carry out plausibility checking of the setting of the operating parameter which is associated with the movement, which plausibility checking can take place, for example, by a voice input, performed with approximately the same timing as the movement or simultaneously therewith, for example by saying the word "window" or by activating an activation element.

A third example is access to a selection or the selection of information from an address book installed on the motor vehicle side or the inputting of a telephone number into a communication system present on the motor vehicle side. Corresponding inputs or selections can be made with the principle by simple movements of the person or certain body parts of the person. A telephone number or the name of a person to be contacted can be written in the air. Of course, settings of a navigation system, for example the inputting of a destination or the like through, for example, corresponding movements, that is to say in particular writing a destination in the air, can also be performed quickly and easily in this manner.

The evaluation or interpretation of the person-specific movement information can be carried out, for example, by interrogations of the memory in which corresponding control information items of certain operating parameters of corresponding vehicle systems are assigned or can be assigned to certain movements or gestures carried out by a person. Consequently, it is expedient if the device is designed to assign a person-specific movement information item based on a certain gesture of a person to a certain setting of an operating parameter of a vehicle system.

It is conceivable here that a corresponding assignment was already performed on the work side but can be individually adapted or extended on the operator side, for example within the scope of a learning mode of the device, provided for this purpose, in which an operator links certain gestures with certain settings of certain vehicle systems. When there are a plurality of persons, person-specific profiles can be created, with the result that for different persons who, of course, have to be previously registered with the device (more details are given on this below), different movements or gestures lead to different settings of different operating parameters of different vehicle systems.

A motor vehicle in the sense is not understood to be solely land motor vehicles such as, for example, passenger cars, trucks, transportation vehicles such as buses, motorbikes etc. The term "motor vehicle" also basically relates to watercraft and/or aircraft.

A person-side movement sensor system expediently comprises at least one inertial sensor. Inertial sensors serve to detect translatory and/or rotary speeds (rotational speeds or rotational rates). Depending on the inertial sensors which form the movement sensor system it is accordingly possible for movements or gestures of a person to be represented in high resolution in corresponding person-specific movement signals. In particular, it is possible to detect speeds or accelerations in six degrees of freedom, that is to say three translatory and three rotational degrees of freedom, if the movement sensor system has a corresponding number of inertial sensors.

The person-side movement sensor system is preferably arranged or can be arranged near to the body, adjacent to the respective person, in particular on or adjacent to a body part of the person. Through the, in particular, direct arrangement of the person-side movement sensor system on the body of the person, movements or gestures of the person can be detected with a high level of accuracy. In this context it is recommended to arrange the person-side movement sensor system on or in the region of body parts which are usually used to carry out gestures, for example generally body parts which can be moved in as varied a way as possible. These include, for example, the region of the lower arm or of the wrist or of the head.

It is conceivable that the person-side movement sensor system is integrated into a mobile phone and/or a key and/or a pair of glasses and/or a pin and/or an item of clothing and/or a watch and/or a piece of jewelry of the person and/or is connected to a mobile phone and/or a key and/or a pair of glasses and/or a pin and/or an item of clothing and/or a watch and/or a piece of jewelry. Consequently, there are a multiplicity of different possibilities for arranging a corresponding movement sensor system, the enumeration of which above is not at all conclusive. In addition to the integration into a mobile phone or generally into a mobile terminal, including, in particular, also portable multimedia devices such as MP3 players or the like, a movement sensor system can also be integrated onto any other object which is to be carried on a body part of a person or connected thereto. In addition to the pairs of glasses already mentioned, there are, for example, also hearing devices. Keys, key tabs, pins, business cards, small cases and portable memory such as, for example, USB sticks etc., which can also be carried generally near to the body, can also be carried with a movement sensor system. Items of clothing, including also accessories which are worn on the body or carried near to the body, such as watches, jewelry or the like, can also be provided with a movement sensor system.

In one advantageous embodiment there is provision that the device is also designed to determine an information item relating to the physical state, in particular the degree of wakefulness and/or degree of attentiveness, of the person and/or an information item classifying a type of driver which the person is from the person-specific movement information, and to take into account the information item relating to the physical state of the person and/or the information item classifying the type of driver of the person, when setting the at least one operating parameter of the at least one vehicle system. In this context, accordingly, the person-specific movement signals which are based on movements, including, in particular, movements which are not intentionally performed by the person with respect to a setting which is to be made of an operating parameter of a vehicle system or the person-specific movement information which is determined from said movement signals, are also used to estimate a physical state of the person or to classify the driver type which the person is. The physical state, which includes, for example, a statement as to how awake and physically effective or tired and physically compromised a person is, or the classification of the person into a specific driver type, which includes, for example, a statement as to whether the driver type is defensive or offensive, is taken into account in the setting of corresponding operating parameters of corresponding vehicle systems. This preferably involves the setting of corresponding operating parameters of corresponding vehicle systems which is carried out automatically by the device and which can for example have the objective of relaxing a physically stressed person by suitable measures which can be carried out by settings of suitable operating parameters of suitable vehicle systems. This embodiment relates primarily to the estimation of the physical state or the classification of the driver type of the driver of the motor vehicle. The detection of a certain person as a driver is carried out by a certain registration of a person with the device, which will be explained in more detail below.

Information relating to the physical state of a person is also to be understood as a level of attentiveness or distraction on the basis of which conclusions can be drawn about the attentiveness or distraction of a person. For example, by using the person-specific movement information it is possible to detect whether a person acting as a driver leans to the side or moves in the direction of the rear of the motor vehicle, which generally gives an indication of lack of attentiveness or distraction of the person.

A person-side movement sensor system which is arranged in the region of the upper body of the person can equally supply, for example, knowledge about physiological processes, in particular relating to breathing, pulse, etc., which permit the physical state of the person to be estimated or categorized. For example, rapid breathing or a high pulse frequency determined by the movement sensor system can indicate a physically stressed or burdened person, causing the device to perform adaptation of certain operating parameters of certain vehicle systems which counteracts this. It is therefore possible, for example, in corresponding cases, for a setting of interior lighting, which is usually experienced as being relaxing, or sound volume adaptation of a multimedia system to be carried out by the device.

By virtue of the high-resolution detection of even relatively small movements of a person by the person-side movement sensor system it is even possible, under certain circumstances, to detect trembling of a person, for example when a touchpad is used, in particular by a frequency analysis of the person-specific movement information, and to draw conclusions therefrom about the physical state, that is to say, in particular, about the stress and tiredness, of the person. Equally, the trembling of a person can provide information about a particular nervous driving style, and classification of a driver type can therefore also be derived from this.

Basically, by determining the physical state of the person or the classification of the person into a driver type, certain vehicle systems, in particular driver assistance systems, can be used more efficiently and, for example, incorrect or early triggering, for example of automatically performed braking processes, can be reduced or prevented if, for example, it was determined previously that the driver is awake and capable of performing.

In one specific embodiment it is possible that the device is designed for determining the information relating to the physical state, in particular the degree of wakefulness and/or degree of attention, of the person and/or the information classifying the driver type which the person is using the person-specific movement information from the person-specific movement signal supplied when the person gets into the motor vehicle. If a person accordingly gets into the motor vehicle in a rapid and agile fashion or moves in a rapid and agile fashion toward the motor vehicle, it is possible to detect, by the person-specific movement signals resulting from the movement and the person-specific movement information determined therefrom, that the person is awake and physically fit. Of course, corresponding movements of a person located inside the motor vehicle can also permit conclusions to be drawn about the physical state of said person as well as allow the driver type to be classified. Under certain circumstances it is therefore possible to derive indications of an aggressive driver type, for example by nervous movements or quickly executed gestures of the person.

In one advantageous development it is possible that the device also comprises at least one motor-vehicle-side movement sensor system, wherein the movement detection apparatus is designed to determine a motor-vehicle-specific movement information item using at least one motor-vehicle-specific movement signal supplied by the motor-vehicle-side movement sensor system and to determine a relative person-specific movement information item relating to the movement of the person relative to the motor vehicle taking into account the motor-vehicle-side movement signal, wherein the device is designed to set the at least one operating parameter of the at least one vehicle system using the relative person-specific movement information. In this way, that is to say by a motor-vehicle-side movement sensor system which is permanently installed, in particular on the motor vehicle side, it is possible to detect movements of a person located inside the motor vehicle even more precisely since disruptive movements of the motor vehicle, for example when traveling on an uneven underlying surface or over a pothole etc., can be differentiated and separated from the movements of the person. In particular it is possible for movement signals which are detected on the part of the motor-vehicle-side movement sensor system to be "subtracted" from movement signals detected on the part of the person-side movement sensor system, with the result that movements of the motor vehicle are, as it were, filtered and not taken into account in the setting of corresponding operating parameters of corresponding vehicle systems. The relative person-specific movement information which is determined by the movement detection apparatus accordingly maps movements or gestures of a person, located in particular inside the motor vehicle, in relation to the motor vehicle, and therefore when corresponding operating parameters of corresponding vehicle systems are set it is possible to take into account essentially exclusively movements or gestures of the person.

The movement detection apparatus can be arranged in a distributed manner in different components or on different components. It is accordingly basically conceivable that the movement detection apparatus or a movement detection apparatus or a part of a movement detection apparatus is arranged in or on the person-side movement sensor system, wherein the movement detection apparatus comprises a transmitter and/or receiver apparatus for transmitting the person-specific movement information to a transmitter and/or receiver apparatus associated with the device, wherein the transmitter and/or receiver apparatuses are designed for wireless communication, in particular via a wireless network. The movement detection apparatus can accordingly be part of an object carrying the person-side movement sensor system. By analogy with the examples specified above in this regard, the movement detection apparatus can accordingly be integrated, for example, together with the movement sensor system into a mobile phone or a pair of glasses. In this context, the function of the movement detection apparatus which is arranged in or on the person-side movement sensor system, that is to say the determination of the person-specific movement information by said apparatus, can be restricted so that said apparatus carries out, for example, only a partial determination of a person-specific movement information item in the sense of pre-evaluation of the person-specific movement signals. In this case, a further movement detection apparatus which carries out the final evaluation of the person-specific movement signals is expediently provided. Alternatively, the movement detection apparatus can also determine in advance at least one person-specific movement information item which is or can be transmitted to the motor-vehicle-side device.

Alternatively or, if appropriate, additionally, the movement detection apparatus or a movement detection apparatus or a part of the movement detection apparatus can be arranged within the motor vehicle, wherein the person-side movement sensor system comprises a transmitter and/or receiver apparatus for transmitting the person-specific movement signal to a transmitter and/or receiver apparatus associated with the movement detection apparatus, wherein the transmitter and/or receiver apparatuses are designed for wireless communication, in particular via a wireless network. The locations for arranging the movement detection apparatus can be selected as desired. The location of the arrangement of the movement detection apparatus inside the motor vehicle advantageously permits easy connection to a bus system provided on the motor vehicle side.

In all cases, the wireless network which is necessary for the communication of the respective transmitter and/or receiver apparatuses may be embodied, for example, as a WLAN or Bluetooth network. Other types of wireless networks are, of course, also conceivable.

There is expediently provision that the device is designed, when there are a plurality of persons located inside the motor vehicle and/or in the vicinity of the motor vehicle, to assign different roles to the respective persons and to take into account the assigned roles during the setting of the at least one operating parameter of the at least one vehicle system. In this context, under one role it is possible, for example, to classify a certain person as a driver and a further person as a front seat passenger. Accordingly, movements or gestures which are carried out by the person performing the role of the driver are to be evaluated or to be interpreted with respect to settings of vehicle systems associated therewith differently from movements or gestures which are executed by the person performing the role of the front seat passenger. Of course, the basic precondition for this is that all the persons are equipped with a corresponding person-side movement sensor system. The operational reliability of the device is improved in such a way since, for example, unintentional movements of a front seat passenger cannot lead to settings of an operating parameter of a vehicle system which are reserved for the driver, that is to say, for example, are not taken into account by the device. These include, in particular, movements which would lead to settings of operating parameters which are relevant to travel, for example of a driver assistance system, so that certain movements of a driver which relate to, for instance, the setting of a target speed do not, when carried out by a front seat passenger, actually bring about any setting of the target speed.

However, certain movements or gestures of the front seat passenger can be selectively used for setting an operating parameter of a vehicle system. For example, a movement of a shoe, equipped with a corresponding movement sensor system, of a front seat passenger in the direction of a floor panel can be taken into account for activation of an emergency brake function of a driver assistance system—with the front seat passenger wishing, as it were, to activate a brake pedal which is not present on the front seat passenger side, with the result that said emergency brake function is carried out, if appropriate, after plausibility checking with the braking behavior of the driver, for example preconditioning of a brake system, or even is activated early overall. Consequently, certain movements of the front seat passenger can be used, in particular, to avoid collisions when assessing hazardous situations.

The assignment of corresponding roles to different persons can be carried out, for example, insofar as the persons are located inside the motor vehicle, by determining the location of the person within the motor vehicle, which can also be carried out by the movement sensor system which is respectively assigned to the persons or the person-specific movement signals which are supplied thereby. If appropriate, assignment can also be made by a certain radio frequency of a radio link between the movement sensor system and the movement detection apparatus or the device, with the result that, for example, the person-side movement sensor system of a person who is to be defined as the driver communicates via a different radio frequency with the movement detection apparatus or the device, as a person-side movement sensor system of a person to be defined as the front seat passenger.

It is also possible that the person-side movement sensor system can be registered with the device by a person-specific identification information item. The person-specific identification information item serves to register a person-side movement sensor system at the device and also, if appropriate, to assign the movement signals supplied by a person-side movement sensor system or the movement information determined therefrom to a certain person, with the result that it is possible, for example, to differentiate whether a person can be classified as a driver or front seat passenger or codriver. Consequently, a person can respectively, by a person-side movement sensor system assigned thereto, be registered at the device by a person-specific, that is to say individual, identification information item, from which person-specific identification information item it is apparent whether or not the person is the driver or movements carried out by the person are movements carried out by the driver. This can then make it possible that after registration and detection of the person as the driver certain movements which are carried out by said person bring about certain settings of certain operating parameters of certain vehicle systems which do not bring about any settings, or bring about different settings, when the same person is detected or registered as the front seat passenger.

The person-specific identification information can be present in different forms, that is to say the person-side movement sensor system can be registered with the device in different ways. In this context it is conceivable, for example, that registration can take place solely by the basic detection of a person-side movement sensor system in conjunction with opening and closing of the driver's door, with the result that, if a person-side movement sensor system is detected and then, optionally within a certain time interval, the driver's door is opened and closed, registration of the detected movement sensor system is detected as a movement sensor system associated with the driver.

It is also conceivable that a person will be registered actively as the driver or front seat passenger at the device. That is to say a certain identification information item is transmitted from the person via the person-side movement sensor system to the device, from which the latter can detect that the person is a driver or a front seat passenger. For this purpose, a suitable software application can be provided on the part of the movement sensor system or on the part of the object carrying the movement sensor system. Accordingly, the software application generates a signal which contains a corresponding information item which classifies a person as a driver or front seat passenger. This embodiment is suitable, in particular, for movement sensor systems which are integrated into mobile terminals (mobile phone, PDA etc.) of the person or connected thereto.

If the person-side movement sensor system is integrated into a mobile terminal equipped with a camera, in particular a mobile phone, it may also be possible to use said movement sensor system to record certain landmarks which classify a person as a driver and are provided on or in the motor vehicle, and correspondingly perform classification on the part of the mobile phone, which classification is then to be transmitted to the device and is taken into account thereby when corresponding operating parameters of corresponding vehicle systems are set.

In all cases, plausibility checking may be additionally expedient, with the result that in addition an interrogation is carried out, for example, as to whether the registration which indicates the driver is verifiable. For this purpose, for example, seat occupation sensors or cameras which are provided inside the motor vehicle may be used, said sensors or cameras checking, after a person-side movement sensor system has been registered as a driver, whether the driver's seat is also actually occupied or a person is located in the area which is to be taken up by the driver.

In one preferred embodiment there is provision that the person-specific identification information item is a person-specific movement information item based on at least one certain gesture of the person. Consequently, a certain movement or a gesture of a person can be used as person-specific identification information for the registration of said person. It is therefore possible for a person to be registered at the device as the driver by, for example, providing his signature, said device having, of course, in this embodiment a memory in which a movement information item, identifiable as a signature, of the person to be considered as the driver is stored, with the result that it is possible to compare the person-specific movement information based on the movement carried out with the person-specific movement information which is stored in the memory and corresponds to the signature. Of course, other movements or gestures are also suitable for registering a person as a driver or front seat passenger.

As already mentioned, the device can comprise at least one memory in which person-specific movement information can be stored. The person-specific movement information which is stored in the memory can serve to assign current person-specific movement information to certain settings, associated therewith, of certain operating parameters of corresponding vehicle systems. Consequently, a circular movement of a person can mean a different setting of another operating parameter of another vehicle system than a linear movement. Equally, person-specific or individual movement profiles and assignments, associated therewith, to certain settings for certain operating parameters of certain vehicle systems can be stored in the memory. As mentioned, a certain movement of a person who is detected as being a driver can bring about a setting of an operating parameter other than the same movement of a person who is registered as the front seat passenger.

Likewise it is possible, in particular with respect to the above-mentioned determination of a physical state, in particular of a degree of wakefulness and/or degree of attentiveness and/or classification of the driver type, to determine knowledge about the physical state of the respective person from a comparison of the person-specific movement information stored in the memory with current person-specific movement information. If said person is registered, for example, as a driver, wherein a person-specific movement information item which indicates that the driver gets into the motor vehicle in an agile way is usually associated with the driver but said person is not present or moves slowly and with difficulty, it can be determined that the driver is tired and/or physically impaired.

The at least one vehicle system can be a driver assistance system, in particular a multimedia system and/or a chassis setting system and/or a longitudinal guidance system and/or lateral guidance system and/or an air conditioning system and/or an interior lighting system and/or an activation system of at least one door, one window, one cover and/or at least one system for setting at least one seat position. The enumeration is by way of example and is not conclusive. Basically, the device can actuate all vehicle systems present in a motor vehicle and correspondingly set, adapt or change operating parameters associated therewith.

In addition, the inventors propose a method for setting at least one operating parameter of at least one vehicle system of a motor vehicle. The method is distinguished by the fact that at least one person-specific movement signal which relates to the movement of the person is transmitted to a movement detection apparatus via at least one person-side movement sensor system of at least one person located inside or in the vicinity of the motor vehicle, which movement detection apparatus determines, using the person-specific movement signal, a person-specific movement information item, on the basis of which a device for setting at least one operating parameter of at least one vehicle system of a motor vehicle sets the at least one operating parameter of the at least one vehicle system of the motor vehicle. The device for setting at least one operating parameter of at least one vehicle system of a motor vehicle is preferably the device described above.

The method accordingly permits operating parameters of vehicle systems which are provided on the motor vehicle side to be set by movements of a person equipped with a person-side movement sensor system, in the sense of a gesture operator control system of corresponding vehicle systems. For this purpose, the movements of the person-side movement sensor system are converted into corresponding person-specific movement signals which are transmitted to the movement detection apparatus which creates a person-specific movement information item from the person-specific movement signals. Using the person-specific movement information, the device for setting at least one operating parameter of at least one vehicle system sets a corresponding operating parameter. As is also mentioned below, knowledge about the physical state, in particular the degree of wakefulness and/or degree of attentiveness and/or classification of the driver type which a person is, can also be derived from the person-specific movement information.

It is to be noted at this point as an example which supplements the examples mentioned with respect to the device it may be possible for a person to open a trunk door, for example, by a specific foot movement which is detected by the person-side movement sensor system and converted into person-specific movement signals and further into a person-specific movement information item. For this purpose, the person-specific movement information, which is based on the foot movement of the person, of the device is assigned to a corresponding control information item for actuating a trunk door activation system.

Basically, all the statements regarding the proposed device apply to the proposed method.

Preferably a movement sensor system which comprises at least one inertial sensor is used as a person-side movement sensor system. Said movement sensor system is designed to detect translatory and/or rotational speeds or accelerations of a person and accordingly supplies high-resolution, person-specific movement signals which are relevant to the movement of the person.

The person-side movement sensor system which is used within the scope of the method is preferably arranged near to the body, adjacent to the respective person, in particular on or adjacent to a body part of the person. The arrangement of the person-side movement sensor system correspondingly near to the body ensures that corresponding movements or gestures of the person are detected sufficiently accurately by the person-side movement sensor system. The person-side movement sensor system is expediently worn on body parts which are particularly moveable or suitable, for example, for carrying out a multiplicity of movements or gestures.

The person-side movement sensor system which is used within the scope of the method is advantageously integrated into a mobile phone and/or a key and/or a pair of glasses and/or a pin and/or an item of clothing and/or a watch and/or a piece of jewelry of the person. It is also conceivable to connect the person-side movement sensor system to a mobile phone and/or a key and/or a pair of glasses and/or a pin and/or an item of clothing and/or a watch and/or a piece of jewelry. Basically, the person-side movement sensor system can be integrated into all objects which are worn on the body or adjacent thereto.

It is conceivable that the device determines an information item relating to the physical state, in particular, to the degree of wakefulness and/or attentiveness, of the person and/or an information item classifying the driver type which the person is from the person-side movement information, wherein the information relating to the physical state of the person and/or the information classifying the driver type which the person is taken into account in the setting of the at least one operating parameter of the at least one vehicle system. The determination of an information item which classifies the physical state, in particular the degree of wakefulness and/or degree of attentiveness, of the person or of an information item which classifies the driver type which the person is from the person-specific movement information can take place, in particular, by a person-specific movement profile stored in a memory associated with the device, with the result that a comparison, in particular of the dynamics or agility, of certain movements or gestures of a person can be made with these corresponding movements or gestures which are stored in the memory in the form of person-specific movement information, with the result that a current person-specific movement information item which maps a slower movement from a in comparison with the person-specific movement information stored in the memory can indicate tiredness or physical impairment of the person. Trembling or wild movement of certain body parts which is mapped, likewise, by the person-specific movement information can allow it to be inferred that the person is an offensive or aggressive driver type.

Information which relates to a physical state of a person can equally also be understood to be a degree of attentiveness or distraction of a person, allowing conclusions to be drawn about the attentiveness or distraction of a person. For example, by using the person-specific movement information it is possible to detect whether a person acting as a driver leans to the side or moves in the direction of the rear of the motor vehicle, which generally gives an indication of lack of attentiveness or distraction of the person. In particular, indications of the movement-related or situational distraction of the respective person can also be derived from the person-specific movement information.

At least one operating parameter of at least one vehicle system is set in accordance with the information which relates to the physical state or the information which classifies the driver type which the person is. For example, a collision warning of a collision warning system can be brought forward in terms of timing or executed with correspondingly clearer signals if it has been determined that the driver appears to be tired. This variant of the method basically relates to a person acting as a driver. In this context it is preferred that the device determines the information which relates to the physical state, in particular the degree of wakefulness and/or the degree of attentiveness, of a person and/or the information which classifies the driver type which the person is using the person-specific movement information from the person-specific movement information determined when the person gets into the motor vehicle.

It is possible that the movement detection apparatus also determines a motor-vehicle-specific movement information item using at least one motor-vehicle-specific movement signal supplied by a motor-vehicle-side movement sensor system, wherein the movement detection apparatus determines a relative person-specific movement information item relating to the movement of the person in relation to the motor vehicle taking into account the motor-vehicle-side movement signal, and the device sets the at least one operating parameter of the at least one vehicle system using the relative person-specific movement information. It is accordingly possible to obtain clearer information about respective movements or gestures of a person within the motor vehicle by discriminating between motor-vehicle-specific movements and person-specific movements, in particular during travel, since motor-vehicle-specific movements, due for example to driving on an uneven underlying surface, are filtered and therefore not taken into account during the setting of corresponding operating parameters of corresponding vehicle systems.

The movement detection apparatus which is used within the scope of the method can be arranged in or on the person-side movement sensor system, wherein the movement detection apparatus comprises a transmitter and/or receiver apparatus for transmitting the person-specific movement information to a transmitter and/or receiver apparatus associated with the device, wherein the transmitter and/or receiver apparatuses are designed for wireless communication, in particular via a wireless network. Alternatively, the movement detection apparatus which is used within the scope of the method can be arranged inside the motor vehicle, wherein the person-side movement sensor system comprises a transmitter and/or receiver apparatus for transmitting the person-specific movement signal to a transmitter and/or receiver apparatus associated with the movement detection apparatus, wherein the transmitter and/or receiver apparatuses are designed for wireless communication, in particular via a wireless network.

The person-side movement sensor system is advantageously registered with the device by a person-specific identification information item, wherein in particular a person-specific movement information item which is based on at least one specific gesture of the person is used as person-specific identification information. Consequently it is possible to register a person-side movement sensor system at the device by a corresponding person-specific identification information item, with the result that a personal profile which is assigned to the particular person-side movement sensor system can be accessed by the registration.

In this context it is conceivable that under certain circumstances a certain person is registered, for example, as a driver, at the device by a certain gesture. In this context, the gesture serves as person-specific identification information, with the result that it is possible, for example, that registration of a person as a driver requires a different movement than registration of a person as a front seat passenger.

The person-specific movement information can be stored in at least one memory, wherein the setting of the at least one operating parameter of the at least one vehicle system takes place as a function of a comparison result relating to the comparison of a current person-specific movement information item with at least one person-specific movement information item which is stored in the memory.

Within the scope of the method it is further possible to provide that the device assigns a person-specific movement information item based on a specific gesture of a person to a certain setting of an operating parameter of a vehicle system.

When there are a plurality of persons located inside the motor vehicle and/or in the vicinity of the motor vehicle, different roles can be assigned to the respective persons and the assigned roles can be taken into account during the setting of the at least one operating parameter of the at least one vehicle system. Consequently it is possible to assign different roles to different persons, wherein in particular certain settings are assigned to the different roles in relation to certain person-specific movement information, with the result that, for example for a person assuming the role of a driver, a certain hand movement brings about a different setting of an, under certain circumstances, different operating parameter of an, under certain circumstances, different vehicle system than a corresponding hand movement of a person assuming the role of a front seat passenger. The assignment of a role to a person can be made, for example, by the above-mentioned registration of the person-side movement sensor system using a person-specific identification information item.

It is possible that a movement information item based on a certain gesture of a person located in the vicinity of the closed motor vehicle is set at least one vehicle system in the form of an activation system of at least one door such that the person can access the interior of the motor vehicle. The particular gesture can be of any desired type. However, it is preferred here that the gesture maps the signature of the respective person, that is to say that the person as it were draws their signature in the air. For this purpose, trials have shown that even the movement underlying the respective signature permits a high degree of assignability of the respective movement to the respective person.

Under certain circumstances it is possible to additionally carry out, in addition to the person-specific movement information based on the particular gesture, verification by detecting a key or the like which is carried by the respective person. This also means at the same time that unauthorized possession of a key does not in fact permit access to the interior of the vehicle since the execution of the particular gesture by a person-side movement sensor system is additionally necessary for this.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
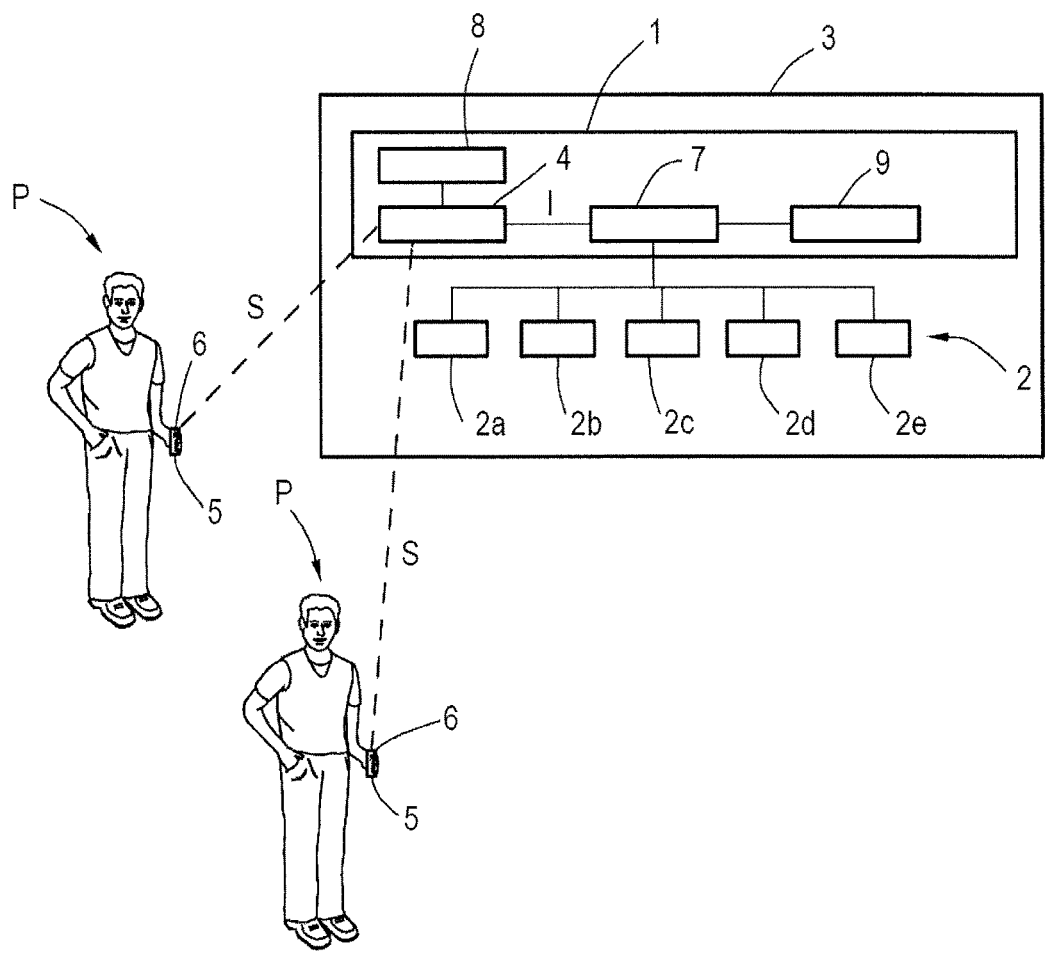
FIG. 1 shows a basic illustration of a motor vehicle comprising the proposed device in an exemplary embodiment.

Reference will now be made in detail to the preferred embodiments of the present invention, examples of which are illustrated in the accompanying drawings, wherein like reference numerals refer to like elements throughout.

FIG. 1 shows a basic illustration of an exemplary embodiment of a motor vehicle 3 comprising the device 1 for setting at least one operating parameter of at least one vehicle system 2 of the motor vehicle 3. Associated with the device 1 is a movement detection apparatus 4 which is designed to determine the movement of one or more persons P located inside the motor vehicle 3 and/or in the vicinity of the motor vehicle 3. The person P carries a person-side movement sensor system 5 near to his body, in particular on or adjacent to a body part, which movement sensor system 5 comprises at least one inertial sensor (not shown in more detail). Possible locations of the arrangement of the movement sensor system 5 are specified with respect to FIG. 3. In the embodiments shown in FIGS. 1 and 2, the movement sensor system 5 is integrated into a person-side mobile terminal in the form of a mobile phone 6.

The movement detection apparatus 4 determines person-specific movement information I of the person P from the person-specific movement signals S which are supplied by the person-side movement sensor system 5, based on movements or gestures of the person P, relate to the movement of the person P and are transmitted via a data link or a wireless network, that is to say, for example, a WLAN or Bluetooth network, from the person-side movement sensor system 5 to the movement detection apparatus 4. Of course, both the movement sensor system 5 and the movement detection apparatus 4 or the device 1 have for this purpose suitable transmitter and/or receiver apparatuses which communicate with one another (not shown).

The device 1 or a central control apparatus 7 associated therewith makes settings of certain operating parameters of the vehicle systems 2 using the person-specific movement information I. The vehicle systems denoted in their entirety by 2 can be embodied, for example, as the collision detection system 2a, longitudinal and/or lateral guidance system 2b, interior lighting system 2c, multimedia system 2d or activation system 2e of a door of the motor vehicle 3. Of course, other embodiments are also conceivable here.

In addition, a motor-vehicle-side movement sensor system 8 is associated with the device 1. The movement detection apparatus 4 accordingly likewise determines a motor-vehicle-specific movement information item using at least one motor-vehicle-specific movement signal which is supplied by the motor-vehicle-side movement sensor system 8 and is used to determine a relative person-specific movement information item relating to the movement of the person P relative to the motor vehicle 3. Of course, the person P must for this purpose be located in the interior of the motor vehicle 3 (cf. FIG. 2). The relative person-specific movement information accordingly relates essentially solely to movements or gestures of the person P, that is to say all the movements of the motor vehicle 3 which possibly take place in parallel with this and which occur, for example, when the vehicle travels over a pothole are filtered. The device 1 then sets corresponding operating parameters of the vehicle systems 2 using the relative person-specific movement information.

The device 1 also comprises a memory 9 in which, for example, a table-like assignment of person-specific movement information I, based on certain gestures of the person P, to certain settings of an operating parameter of a vehicle system 2 is stored.

The memory 9 can, in particular, also serve for registering a person-side movement sensor system 5 of a person P with the device 1 by a person-specific identification information item. For the registration of a person-side movement sensor system 5 with the device 1 there is the possibility of the person P registering the person-side movement sensor system 5 at the device 1 actively, for example, by using a software application which is provided by the object accommodating the movement sensor system 5, that is to say, for example, the mobile phone 6. Within the scope of the registration, at the same time a role assignment can take place, that is to say the registered movement sensor system 5 is assigned, for example, to a person P who acts as a driver.

Alternatively or additionally it is possible that the person-specific identification information is a person-specific movement signal S which is based on at least one particular gesture of the person P, that is to say also a person-specific movement information item I. Consequently, a certain movement of the person P, such as, for example, the writing of their signature in the air, can be used as person-specific identification information, with the result that when a person-specific movement information item I which maps the writing of the signature in the air is determined on the part of the movement detection apparatus 4 the person P is registered as the driver. Of course, in this way it is also possible to register further persons P at the device 1, with the result that, for example, another movement of a person P which is due, where appropriate, to another signature being written in the air is used as identification information for registering this person P as a front seat passenger. Of course, a plurality of person-specific movement information items I which relate to person-specific signatures can also be stored in the memory 9 and can be respectively assigned, for example, the role as driver when a movement information item I, corresponding to said items, of the respective movement sensor system 5 is detected.

By registering a plurality of persons P by person-side movement sensor systems 5 which are respectively assigned to said persons P at the device 1 it is possible to assign the movements, that is to say the person-specific movement information items I associated therewith, to different settings of different operating parameters of the vehicle systems 2. If, for example, movement of a hand to the left or to the right is transmitted via the movement sensor system 5 assigned to the person P registered as a driver, the central control apparatus 7 can bring about settings of the longitudinal and/or lateral guidance system 2b on the basis of the person-specific movement information items I associated therewith, that is to say, for example, steering maneuvers, accelerations etc. can be set or carried out. If the same movement is carried out by a person P who is registered as a front seat passenger, that is to say corresponding person-specific movement signals S are transmitted via the movement sensor system 5 assigned to the front seat passenger and are converted into a corresponding person-specific movement information item I, for example no setting of an operating parameter of the longitudinal and/or lateral guidance system 2b is brought about. The execution of the same movement by the front seat passenger can bring about a setting of another operating parameter of another vehicle system 2 or may not be taken into account at all.

Accordingly, by registering the person-side movement sensor system 5 with the device 1 it is possible, on the one hand, to assign roles to the respective persons P which are taken into account during the setting of the at least one operating parameter of the at least one vehicle system 2 and, on the other hand, to assign a person-specific movement information item I, based on a certain movement or gesture of a person P, to a certain setting of an operating parameter.

By using the person-specific movement information I, the device 1 can also determine an information item which relates to the physical state, in particular the degree of wakefulness and/or degree of attentiveness, of the person P and/or an information item which classifies the driver type which the person P is, and take these into account during the setting of the at least one operating parameter of the at least one vehicle system 2. If, accordingly, it is determined, from a person-specific movement information item I which is based on a particular movement of the person P which may be, for example, the person P getting into the motor vehicle 3, that the person P is tired or physically impaired, or, for example, as a result of the person leaning in the direction of the rear of the motor vehicle, is distracted from the current events on the road, it is possible to make, in particular automatically, corresponding settings of suitable operating parameters of suitable vehicle systems 2. It is therefore possible for the collision detection system 2a to output earlier and/or more intensively a warning which indicates a possible collision of the motor vehicle 3 with a collision object.

In particular, the physical state of the person P is determined by a comparison of a movement information item I, on which a current movement of a person P is based, with a movement information item I, on which the same movement is based and which serves as a reference and is stored in the memory 9.

The driver type may be classified, for example, by abrupt or unsteady movements of the person P who is acting or is registered as the driver, which movements are also mapped in corresponding, person-specific movement information items I. A comparison with movement information I corresponding to corresponding movement patterns and stored in the memory 9 can also be expediently carried out here. If a driver is categorized as aggressive on the basis of his gestures, it is possible, in turn, to take, in particular automatically, corresponding measures which have a steadying and relaxing effect on the driver. It is therefore conceivable, for example, to make adjustments to the sound volume of the multimedia system 2*d* or to make the interior lighting by the interior lighting system 2*c* more pleasant.

Figure 2:
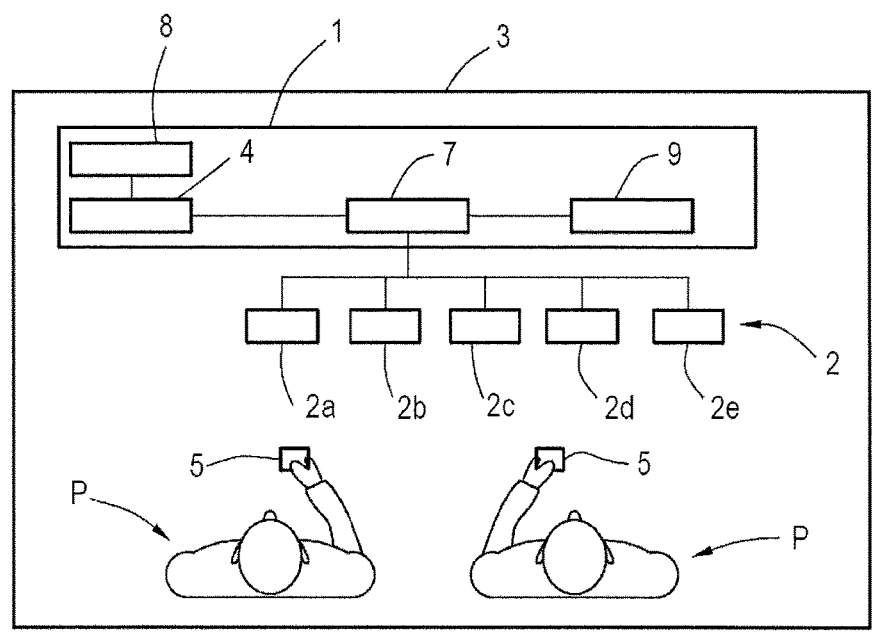
FIG. 2 shows a basic illustration of a motor vehicle comprising the proposed device in a further exemplary embodiment.

FIG. 2 shows a basic illustration of a motor vehicle 3 comprising the device 1, in a further exemplary embodiment. The significant difference from the embodiment shown in FIG. 1 is that the persons P are not located outside the motor vehicle 3, that is to say in the vicinity thereof, but rather inside the motor vehicle 3. The person P illustrated on the left is registered here as a driver at the device 1 by the person-side movement sensor system 5 associated with said person, while the person P illustrated on the right is registered as a front seat passenger at the device 1 by the person-side movement sensor system 5 associated with said person P. By the person-specific movement information items I associated with the movements or gestures of the persons P it is possible, in addition to the setting of corresponding operating parameters of corresponding vehicle systems 2, also to detect an operator control direction of an activation element (not shown) located, for instance, in a center console, for example of a turn and press controller. If activation of the activation element is detected simultaneously with a movement, that is to say, for example, a turning or pressing movement, by the front-seat-passenger-side movement sensor system 5, the function brought about by the operator control of the activation element, that is to say, for example, setting of an air conditioning system, can take place in an area-related fashion with the result that said setting relates only to the area of the front seat passenger, that is to say the person P on the right. It is also conceivable that certain movements of the movement sensor system 5 which are assigned to the person P who is acting as the front seat passenger only bring about opening of the front-seat-passenger-side window but not of other windows of the motor vehicle 3.

Equally, the person-specific movement information I on which the activation of the activation element is based can also supply, according to the above-mentioned principle, conclusions about the physical state, in particular the degree of wakefulness and/or distraction, of the respective person P.

In one particular embodiment it is also conceivable to allow a front seat passenger to intervene in the driving operation of the motor vehicle 3 by carrying out a certain movement. The movement may be, for example, activation, conceived by the front seat passenger, of, or a movement towards, a brake pedal which is usually not present on the front seat passenger's side, wherein corresponding movements of the front seat passenger are detected, for example, by a movement sensor system 5 which is arranged in a shoe of the front seat passenger. This could result, for example, in pre-conditioning of a brake system being carried out within the scope of an emergency braking assistance function if, for example, the driver is not attentive, that is to say, for example, if the driver-side movement sensor system 5 transmits movement signals S from which it is apparent that the driver is currently turning in the direction of the rear of the vehicle.

As an alternative to the embodiments shown in FIGS. 1 and 2, it is also possible that the movement detection apparatus 4 or a part of the movement detection apparatus 4 or a further movement detection apparatus 4 is arranged in or on the person-side movement sensor system 5. The latter has a transmitter and/or receiver apparatus (not shown) for transmitting the person-specific movement information item I to a transmitter and/or receiver apparatus (not shown) which is associated with the device 1, that is to say is provided on the motor vehicle side, wherein the transmitter and/or receiver apparatuses are designed for wireless communication, in particular via a wireless network. In this case, a person-specific movement information item I can be determined outside the motor vehicle 3, with the result that the motor-vehicle-side device 1 only has to make an assignment of a corresponding setting of an operating parameter of a vehicle system 2 to the transmitted, person-specific movement information I. The person-specific movement information I which is determined outside the motor vehicle 3 can also only be obtained partially, with the result that in the device 1 itself it is necessary to provide a further movement detection apparatus 4 by which the partially determined and transmitted person-specific movement information I is conclusively evaluated or interpreted and converted into a corresponding person-specific movement information item I on which the setting of an operating parameter is based.

Figure 3:
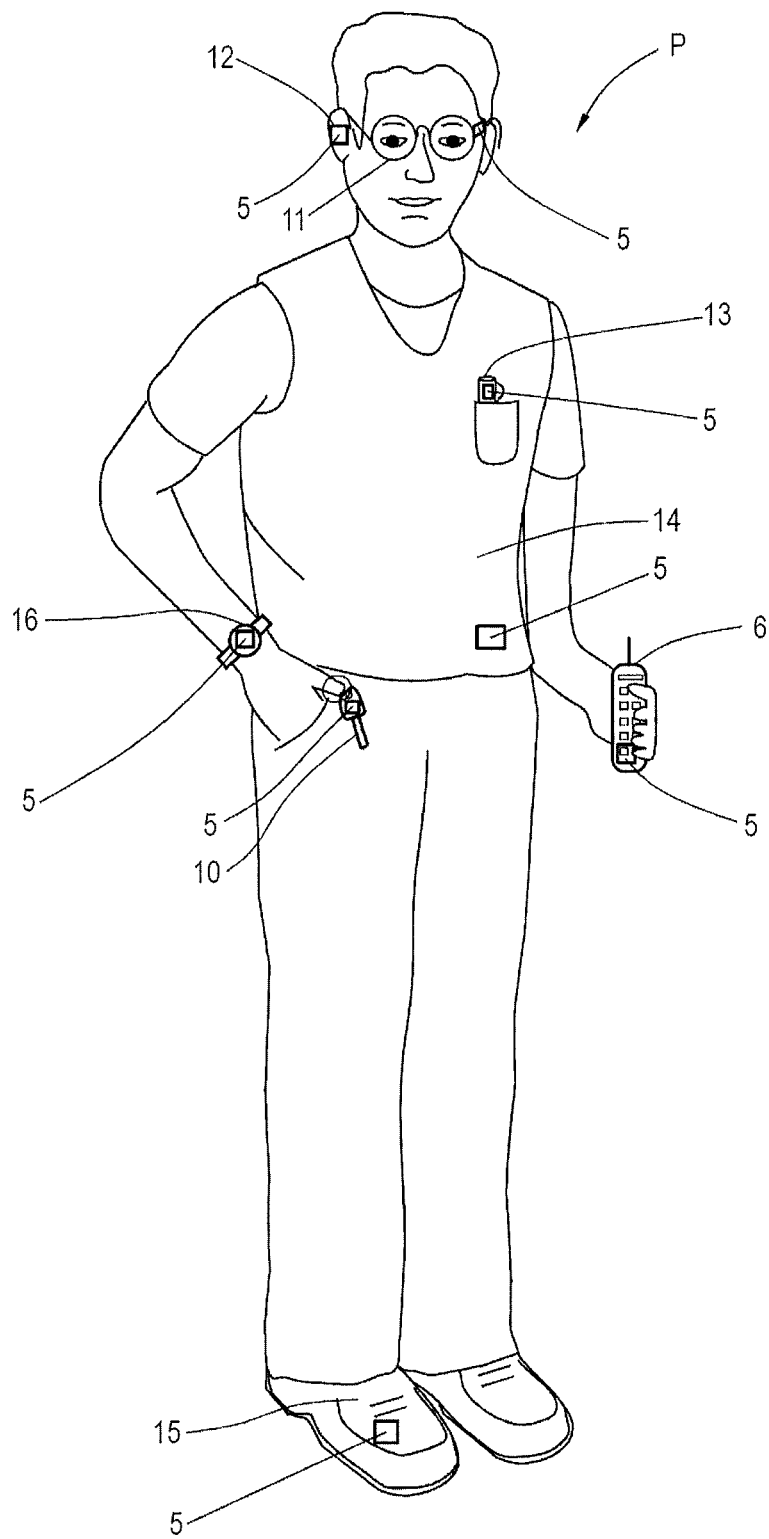
FIG. 3 shows possible locations of the arrangement of a person-side movement sensor system according to the proposal on a person.

FIG. 3 shows possible locations of the arrangement of a person-side movement sensor system 5 on a person P. It is clear that the person-side movement sensor system 5 can be arranged or carried at different locations or on different body parts of the person P. The arrangement depends, in particular, on what type of object the person-side movement sensor system 5 is integrated into or what type of object the person-side movement sensor system 5 is connected to. The possibilities of the arrangement of a person-side movement sensor system 5 shown in FIG. 3 are merely by way of example.

The integration of the person-side movement sensor system 5 into a mobile phone 6, a key 10, a pair of glasses 11, a hearing aid 12, a pin 13 as well as an item of clothing for the upper part of the body 14 or a shoe 15 and a wrist watch 16 is shown. It is also conceivable to integrate a corresponding movement sensor system 5 into a belt or other accessories worn on the body of the person P such as, for example, items of jewelry such as, for example, rings, earrings, cufflinks, gloves or the like.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV,

The invention claimed is:

1. A device of a motor vehicle, comprising:
   a receiver to receive a movement signal generated by a person-side movement sensor system and transmitted to the receiver from the person-side movement sensor system, the movement signal relating to movement of a person located inside or in a vicinity of the motor vehicle;
   a movement detection apparatus to identify the movement based on the movement signal received by the receiver and to convert the movement signal into person-specific movement information to determine a person-specific movement information item;
   a memory to store entries assigning person-specific movement information items with settings, each entry having a corresponding operating parameter setting for a corresponding vehicle system; and
   a controller to make the corresponding operator parameter setting for the person-specific movement information item determined by the movement-detection apparatus by comparing the person-specific movement information item determined by the movement-detection apparatus with the entries stored in the memory,
wherein
the device comprising the receiver, movement detection apparatus, memory, and controller is integrally coupled to the motor vehicle,
the person-side movement sensor system is externally disposed with respect to the device,
when a plurality of people are located inside or in the vicinity of the motor vehicle, the receiver is configured to receive movement signals respectively from the plurality of people,
a role relating location with respect to the motor vehicle, is assigned to each person among the plurality of people, and
the settings are assigned to person-specific movement information items taking into account the role assigned to each person among the plurality of people.

2. The device as claimed in claim 1, wherein the person-side movement sensor system comprises an inertial sensor.

3. The device as claimed in claim 1, wherein the person-side movement sensor system is arranged adjacent to a body part of the person.

4. The device as claimed in claim 1, wherein the person-side movement sensor system is a personal device to be worn or carried adjacent to a body part of the person.

5. The device as claimed in claim 1, wherein the person-side movement sensor system is integrated into or attachable to at least one of a mobile phone, a key, a pair of glasses, a pin, an item of clothing, a watch, and a piece of jewelry.

6. The device as claimed in claim 1, wherein
the person is a driver of the motor vehicle,
the person-specific movement information item is used to classify the person as being at least one of tired, awake, attentive, and inattentive, and
the controller makes the corresponding operator parameter setting to adapt the vehicle for being driven by at least one of a tired, awake, attentive, and inattentive driver.

7. The device as claimed in claim 6, wherein
the device classifies the person as being at least one of tired, awake, attentive, and inattentive based on movements of the person when the person gets into the motor vehicle.

8. The device as claimed in claim 1, wherein
the device further comprises a motor-vehicle-side movement sensor system to identify movements of the motor vehicle and determine a motor-vehicle-specific movement information item, and
the movement detection apparatus identifies movement of the person relative to the motor vehicle using the motor-vehicle-specific movement information item supplied by the motor-vehicle-side movement sensor system such that the person-specific movement information item is a relative person-specific movement information item.

9. The device as claimed in claim 1, wherein
the receiver is a wireless receiver, and
the person-side movement sensor system comprises a wireless transmitter to transmit the movement signal.

10. The device as claimed in claim 1, wherein
the movement signal relates to a hand gesture of the person, and
the person-specific movement information item is determined based on the gesture.

11. The device as claimed in claim 1, wherein
the movement detection apparatus identifies the person as a driver of the motor vehicle by matching the movement of the person with typical driver movements, and
the controller makes a driver-appropriate operator parameter setting for a driver-appropriate vehicle system.

12. The device as claimed in claim 1, wherein
the motor vehicle is occupied by a plurality of people, and
the person-specific movement information item is determined such that the same gesture produces different operator parameter settings for different people.

13. The device as claimed in claim 1, wherein the receiver receives a person-specific identification information item to register the person-side movement sensor system with the device.

14. The device as claimed in claim 13, wherein
the person-specific identification information item is a person-specific gesture of the person.

15. The device as claimed in claim 14, wherein
to identify the person, the memory stores each person-specific gesture.

16. The device as claimed in claim 1, wherein
the vehicle system is at least one system selected from the group consisting of a driver assistance system, a multimedia system, a chassis setting system, a longitudinal guidance system, a lateral guidance system, an air conditioning system, an interior lighting system, a door activation system, a window activation system, a trunk opening system and a seat position system.

17. The device as claimed in claim 1, wherein
the vehicle system is at least one system selected from the group consisting of a door activation system, a window activation system, and a seat position system,
the motor vehicle has a plurality of doors, a plurality of windows and a plurality of seats,
the person is associated with only one door, only one window and only one seat, and
the corresponding operating parameter setting adjusts only at least one of the door, window, and seat associated with the person.

18. A method for setting an operating parameter of a vehicle system of a motor vehicle, comprising:
receiving, by a receiver, a movement signal which relates to a movement of a person located inside or in a vicinity of the motor vehicle, the movement signal being received from a person-side movement sensor system which generates the movement signal and transmits the movement signal to the receiver;
identifying, by a controller, the movement based on the movement signal received by the receiver and converting the movement signal into person-specific movement information to determine a person-specific movement information item;
matching, by the controller, the person-specific movement information item with a corresponding operating parameter setting for a corresponding vehicle system; and
making, by the controller, the operator parameter setting corresponding to the person-specific movement information item by comparing the person-specific movement information item with entries assigning person-specific movement information items with settings,
wherein
the receiver and controller are included in a device integrally coupled to the motor vehicle,
the person-side movement sensor system is externally disposed with respect to the device, and when a plurality of people are located inside or in the vicinity of the motor vehicle:
  receiving movement signals respectively from the plurality of people,
  assigning a role relating location with respect to the motor vehicle to each person among the plurality of people, and
  the matching the person-specific movement information item with the corresponding operating parameter setting for the corresponding vehicle system takes into account the role assigned to each person among the plurality of people.

* * * * *